(12) United States Patent
Fedorov (10) Patent No.: US 7,705,299 B2
(45) Date of Patent: Apr. 27, 2010

(54) SCANNING ION PROBE SYSTEMS AND METHODS OF USE THEREOF

(75) Inventor: Andrei G. Fedorov, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 135 days.

(21) Appl. No.: 12/132,730

(22) Filed: Jun. 4, 2008

(65) Prior Publication Data
US 2008/0265157 A1 Oct. 30, 2008

Related U.S. Application Data

(62) Division of application No. 11/336,137, filed on Jan. 19, 2006, now Pat. No. 7,442,927.

(51) Int. Cl.
*H05H 3/02* (2006.01)

(52) U.S. Cl. .................. 250/307; 250/306; 250/309; 250/310; 250/311; 250/423 R; 250/424

(58) Field of Classification Search ................. 250/306, 250/307, 309, 311, 281, 282, 423 R, 424
See application file for complete search history.

(56) References Cited

U.S. PATENT DOCUMENTS

| | | | | | |
|---|---|---|---|---|---|
| 3,220,401 | A | * | 11/1965 | Jones et al. ............... | 126/91 A |
| 7,232,922 | B2 | | 6/2007 | Su et al. ..................... | 250/288 |
| 7,411,182 | B2 | * | 8/2008 | Fedorov et al. ............. | 250/251 |
| 7,442,927 | B2 | * | 10/2008 | Fedorov ..................... | 250/309 |
| 2003/0129737 | A1 | | 7/2003 | van der Weide | |
| 2007/0164210 | A1 | * | 7/2007 | Fedorov et al. ............. | 250/288 |
| 2007/0164216 | A1 | * | 7/2007 | Fedorov ..................... | 250/309 |
| 2008/0230693 | A1 | * | 9/2008 | Fedorov et al. ............. | 250/288 |
| 2008/0265157 | A1 | * | 10/2008 | Fedorov ..................... | 250/307 |

OTHER PUBLICATIONS

Van Berkel, et al.; Liquid Microjunction Surface Sampling Probe Electrospray Mass Spectrometry for Detection of Drugs and Metabolites in Thin Tissue Sections; Journal of Mass Spectrometry; 2008; 48; pp. 500-508.
Balakin, et al.; Filed Extraction of Ions from Liquid Solutions with the Use of Polymer Track Membranes; Journal of Electrostatics; 64; (2006) pp. 555-561.
Yakoviev; et al; Membrane Ion Source for Mass Spectrometry; Analytical Chemistry; vol. 66, No. 10; May 15, 2004; pp. 1704-1707.
Balakin, et al.; Polymer Track Membranes for Extraction of Ions from Aqueous Solutions at Atmospheric Pressure; Eur. J. Mass Spectrom.; 8, (2002); pp. 79-84.

* cited by examiner

*Primary Examiner*—David A Vanore
(74) *Attorney, Agent, or Firm*—Thomas, Kayden, Horstemeyer & Risley, LLP (57) ABSTRACT

Briefly described, embodiments of this disclosure, among others, include scanning ion probe systems, methods of use thereof, scanning ion source systems, methods of use thereof, scanning ion probe mass spectrometry systems, methods of use thereof, methods of simultaneous ion analysis and imaging, and methods of simultaneous mass spectrometry and imaging.

15 Claims, 4 Drawing Sheets

SCANNING ION PROBE SYSTEMS AND METHODS OF USE THEREOF

CROSS-REFERENCE TO RELATED APPLICATION

This application is a divisional application of copending U.S. utility application entitled, "Scanning Ion Probe Systems and Methods of Use Thereof," having Ser. No. 11/336,137, filed Jan. 19, 2006, which is related to copending U.S. Utility Application entitled "Reverse-Taylor Cone Ionization Systems and Methods of Use Thereof" to Fedorov et al., filed on Jan. 19, 2006 and assigned Ser. No. 11/336,136, which is entirely incorporated herein by reference.

FIELD OF THE DISCLOSURE

The present disclosure relates generally to ionization systems and methods.

BACKGROUND

Recent advances in micro/nano fabrication technologies have made possible the development of a family of scanning ion probes that allows one to obtain topological, optical, thermal, and (bio)electrochemical information simultaneously, in-situ, and with high spatial and temporal resolution. Integration of the atomic force microscope (AFM) probe with other scanning probes, such as scanning electrochemical microscope (SECM), scanning near-field optical microscope (SNOM), scanning thermal microscope (SThM), and others, produced a unique ability to simultaneously detect electrical, magnetic, thermal, mechanical, acoustic, and chemical signals. In 1997, Berger et al. introduced the idea of the "lab-on-a-tip" to detect magnetic, electrical, thermal, chemical reaction, stress, and flow signals at the ultimate limits of sensitivities through the cantilever based scanning probe. [See, Berger, R., Gerber, C., Lang, H. P., and Gimzewski, J. K. *Micromechanics: a toolbox for femtoscale science: "towards a laboratory on a tip"*, Microelectronic Engineering, 35, 373-379, 1997]. However, these techniques have limitations that embodiments of the present disclosure at least partially overcome.

SUMMARY

Briefly described, embodiments of this disclosure, among others, include scanning ion probe systems, methods of use thereof, scanning ion source systems, methods of use thereof, scanning ion probe mass spectrometry systems, methods of use thereof, methods of simultaneous ion analysis and imaging, and methods of simultaneous mass spectrometry and imaging.

One exemplary scanning ion source system, among others, includes: a scanning ion probe and an ion generation chamber including a membrane disposed at a first end of the ion generation chamber and chamber walls interfaced with the membrane, wherein the membrane includes a plurality of orifices through the membrane, and wherein the scanning ion probe is disposed adjacent the membrane.

One exemplary method of the disclosure, among others, includes: providing a scanning ion source system; as described herein disposing the scanning ion probe into a sample, wherein the sample includes an electrolyte, and wherein the sample is disposed adjacent a sample electrode; determining a first location in the sample using the scanning ion probe; applying a first voltage to the sample electrode and a second voltage to the membrane; ionizing molecules in the sample to produce a plurality of first ionized molecules, wherein the difference between the first voltage and the second voltage generates a first potential force that drives the first ionized molecules towards the membrane, wherein the first ionized molecules are from the first location; producing a reverse-Taylor-cone of the electrolyte through one or more of the orifices in the membrane, wherein the electrolyte includes the first ionized molecules; and applying a third voltage to an ion generation chamber electrode disposed on a portion of the chamber walls, wherein the difference between the third voltage and the second voltage generates a second potential force that drives the first ionized molecules towards a second end of the ion generation chamber.

One exemplary method of the disclosure, among others, includes: disposing a scanning ion probe into a sample, wherein the sample includes an electrolyte, wherein the scanning ion probe is disposed on a first side of a membrane having a plurality of orifices; determining a first location in the sample using the scanning ion probe; ionizing molecules in the first location of the sample to produce a plurality of first ionized molecules, wherein the first ionized molecules are disposed on the first side of the membrane; producing a reverse-Taylor-cone of the electrolyte through one or more of the plurality of orifices in the membrane on a second side of the membrane opposite the scanning ion probe, wherein the electrolyte includes the first ionized molecules; generating de-solvated first ionized molecules from the reverse-Taylor-cone of the electrolyte on the second side of the membrane; and generating a potential force on the second side of the membrane that drives the de-solvated first ionized molecules away from the membrane.

One exemplary scanning ion probe system, among others, includes: an array of scanning ion sources. Each scanning ion source includes: a scanning ion probe, and an ion generation chamber including a membrane disposed at a first end of the ion generation chamber and chamber walls interfaced with the membrane, wherein the membrane includes a plurality of orifices through the membrane, and wherein the scanning ion probe is disposed adjacent the membrane.

Other systems, methods, features, and advantages of this disclosure will be or become apparent to one with skill in the art upon examination of the following drawings and detailed description. It is intended that all such additional systems, methods, features, and advantages be included within this description, be within the scope of this disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Scanning ion probe systems, methods of use thereof, scanning ion source systems, methods of use thereof, scanning ion probe mass spectrometry systems, methods of use thereof, methods of simultaneous ion analysis and imaging, and methods of simultaneous mass spectrometry and imaging, are disclosed.

The present disclosure includes systems and methods for generation, collection, and detection of ions that are combined with scanning ion probes (e.g., AFM, SECM, SNOM, SThM, and the like) to enable new analytical capabilities of the "lab-on-the-tip". Among numerous applications in the chemical and materials sciences, the scanning ion probe systems and methods may be one of the more effective tools for cellular biology and medical research.

In general, embodiments of the present disclosure include a scanning ion probe and an ion generation chamber that includes a membrane. The scanning ion probe is disposed adjacent the membrane (e.g., directly or indirectly on the membrane). The membrane includes a plurality of orifices through the membrane. The scanning ion probe and/or the membrane can be introduced to a location in a sample. The sample includes an electrolyte, and ions of interest can be generated in the sample, as discussed in more detail below. The scanning ion probe can be used to determine the location of the ion generation chamber in the sample. A reverse-Taylor-cone can be produced through the orifices in the membrane to disperse the electrolyte as charged droplets (e.g., containing the ions from the sample) into the ion generation chamber. Although not intending to be bound by theory, these droplets proceed through a sequence of desolvation (e.g., solvent evaporation) and electrical fission events leading to production of disolvated "dry" ions. The ions can then be stored and/or analyzed using one or more techniques (e.g., mass spectrometry).

By knowing the specific location in the sample of the ion generation chamber using the scanning ion probe, it can be determined that the ions entering the ion generation chamber are from an area proximate the known location. The spatial extent of this "sampling" area gives the spatial resolution of the device. The sampling area is defined by diffusion and migration of ions of interest under the influence of the imposed electric field (expected to be in the range of about 1 to 100 nm) and is controlled, at least in part, by the size and/or geometry of the scanning ion probe, the electrolyte composition, and the imposed electric field. As a result, a simultaneous topographical (e.g., location) map of the ionic species of the sample (a "topographic map" of ionizable species of the sample) can be obtained. Therefore, simultaneous or substantially simultaneous ion analysis and sample imaging (or location of the ionized species in the sample) can be conducted, which can be used to identify the component composition of a sample at different locations in a sample (e.g., in the x-, y-, and/or z-axis). In an embodiment of the present disclosure, the scanning ion probe can be combined with other probes to obtain optical characteristics, thermal, characteristics, and the like characteristics, of the sample.

The embodiments of the present disclosure are advantageous in that in situ simultaneous ion analysis and sample imaging can be performed. For example, an ion analysis can be conducted for one or more areas of a sample to determine the component composition (e.g., chemical and/or biological composition) of each of the areas. In another example, embodiments of the present disclosure can be used to study complex biological samples, where the component composition and/or topography can vary greatly from one area of a sample to another. In another example, embodiments of the present disclosure can be used to study biological molecules on a single cell basis and/or to study the biological molecules on the surface of the cell and/or within the cell. In another example, embodiments of the present disclosure can also be used for detection (e.g., via high throughput imaging in the scanning ion probe array format) of biochemical molecules that are intrinsically charged or that can be externally (e.g., electrochemically) charged (e.g., proteins, DNA, RNA, and the like). Such functionalities would be useful in analyzing biological tissue constructs, analyzing DNA/RNA/protein gel microarray readouts, screening of tasks, such as catalyst libraries, and the like.

Figure 1:
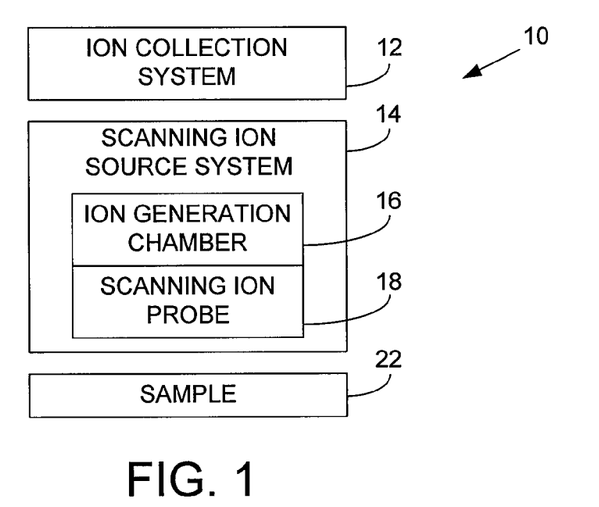
FIG. 1 illustrates a block diagram of an embodiment of a scanning ion probe system of the present disclosure.

FIG. 1 illustrates a block diagram of an embodiment of a scanning ion probe system 10. The scanning ion probe analysis system 10 includes, but is not limited to, an ion collection system 12, a scanning ion source system 14, and a sample 22. The scanning ion probe analysis system 10 can be used to position the ion collection system 12 at a known location in the sample 22 using the scanning ion probe 18 and to analyze the ions generated from the selected location of the ion collection system 12, all performed simultaneously or substantially simultaneously (within a short time frame (e.g., microseconds to minutes)). Then, the scanning ion probe system 10 can be relocated to another known position or location in the sample and can perform a second analysis. In this manner, a plurality of areas of the sample in the x-, y-, and/or z-axis directions can be analyzed to obtain an ion "topographic map" of the sample. The map may provide insight into the chemical and/or biological species located at one or more locations within and/or on the surface of the sample.

In another embodiment, a plurality of scanning ion probes (e.g, an array of the scanning ion probes) can be used for high throughput applications. Each scanning ion probe can be operated independently (e.g., in sensing and/or actuation) from the other scanning ion probes and/or operated in unison. Use of an array of independent scanning ion probes can facilitate analysis of a large area of a sample, and/or facilitate analysis of a plurality of samples.

The sample 22 can include, but is not limited to, a biological sample (e.g., cells, tissue constructs, DNA/protein microarrays, and the like), a chemical sample (e.g., catalysts, ionic liquids, and the like), and combinations thereof, disposed in an electrolyte. The electrolyte can include, but is not limited to, an electrolytic solution and/or electrolytic solid/gel. For example the electrolyte can include, but is not limited to, water, salts, organic solvents (i.e. methanol, toluene, and amines), gel conducting polymer, and combinations thereof. A potential voltage is applied to the sample to generate ions within the electrolyte. The ions generated in the electrolyte can subsequently be directed into the scanning ion source system 14 using another potential voltage (e.g., applied to a membrane). In an embodiment, the potential voltage can be applied to specific areas of the sample, while not being applied to other areas of the sample.

The scanning ion source system 14 can include, but is not limited to, an ion generation chamber 16 and a scanning ion probe 18. The scanning ion probe 18 can be used to determine the position of the ion generation chamber 16 relative to the sample 22 in the x-, y-, and/or z-axis. Therefore, by knowing the position on the sample that the ion generation chamber 16 is proximally located, a determination of the chemical and/or biological composition of that portion of the sample can be ascertained. The scanning ion probe 18 can include scanning ion probes such as, but not limited to, an atomic force microscope probe, a scanning tunneling microscope probe, a scanning near field optical microscope probe, a scanning electrochemical microscope probe, a scanning thermal microscope probe, and a surface force apparatus probe.

The size and type of the scanning ion probe 18 depends, at least in part, on the sample to be analyzed, the sample characteristics (e.g., dielectric vs. conducting, flexible vs. rigid, isothermal vs. non-isothermal, and the like), and the properties of interest to imaging (e.g., topography, florescence, temperature, combinations thereof, and the like). In an embodiment, the scanning ion probe can be made of or coated with a dielectric material, or in another embodiment, the scanning ion probe can be made of or coated with a conductive material. For example, the scanning ion probe can be made of or coated with a material such as, but not limited to, silicon oxide, silicon nitride, glass, quartz, polymers, metals, carbon, and combinations thereof. Additional details regarding the ion generation chamber 16 are discussed herein.

The ion generation chamber 16 can extract the solvated ions from the electrolyte and into the ion generation chamber 16. The ion generation chamber 16 can be used to de-solvate the solvated ions and guide them to the end of the ion generation chamber opposite the membrane or to some other appropriate location. The ion generation chamber 16 can include, but is not limited to, a membrane located at one end of the ion generation chamber 16, chamber walls with an integrated electrode or an array of individually-controlled electrodes, and optionally, a heating element adjacent the chamber walls to heat the area within the ion generation chamber 16 to assist in de-solvation.

The shape of the ion generation chamber can vary depending on the specific application. In general, the ion generation chamber has a cylindrical, square, or rectangular geometry. The ion generation chamber has a length of about 10 nanometers to 100 centimeters and a width of about 1 nm to 100 mm. The ion generation chamber can be made of materials such as, but not limited to, conductors, semiconductors, and dielectrics.

The membrane is appropriately interfaced (e.g., electrically isolated) with the chamber walls so that different electric potentials can be applied to the membrane and/or electrodes of the chamber walls to produce an appropriate electric field for driving ions via electromotive force. The membrane includes a plurality of orifices through the membrane. Upon application of an appropriate electric potential (voltage) to the membrane, a reverse-Taylor cone of the electrolyte is electrohydrodynamically-induced and extends through one or more of the plurality of membrane orifices into the ion generation chamber 16 to form solvated ions. The reverse-Taylor cone is similar to the conventional Taylor cone used in electrospray, except rather than spraying a solution out of a capillary tube filled with the electrolyte solution to form a cone and disperse fluid into droplets, the cone described herein (shown in FIG. 2) starts outside of the capillary (either at the free surface of the liquid or at each membrane orifice) and then is drawn into the sampling capillary (ion generation chamber) by the electric force exerted on the electrolyte ions upon application of appropriate electric field created due to different voltages applied to the substrate V0, the membrane electrode V1, and the chamber wall electrodes V2 (See FIG. 2). The formation of the reverse-Taylor cone is dependent, at least, upon the electrolyte, the membrane, the diameters of the orifices, one or more of the applied electric potentials (electrode voltages), the electrode locations, the strength and orientation of the electric field, and the like.

In embodiments having a plurality of independent scanning ion probes, each scanning ion probe can use the same membrane or a different membrane. In addition, each scanning ion probe can include its own ion generation chamber or more than one probe can use the same ion generation chamber. Various configurations are contemplated and are intended to be included herein although not specifically described.

The membrane can be made of materials such as, but not limited to, metals (e.g., gold, platinum, copper, steel, combinations thereof, and the like), conductive materials (e.g., polyacetylene and poly(para phenylene vinylene) (PPV)), combinations thereof, and the like), semiconductor materials (e.g., Silicon (Si), Germanium (Ge), Gallium Arsenide (GaAs), combinations thereof, and the like), doped semiconductor materials, dielectric materials (e.g., glasses, ceramics (e.g., borosilicate, and alumina or aluminosilicates), various metal oxides (e.g., tantalum oxide, aluminum oxide, silicon oxide, combinations thereof, and the like), polymers (e.g., polyesters/Mylar, Kapton, polycarbonate, combinations thereof, and the like), and combinations thereof. In an embodiment, the membrane is coated with a conductive material, and the material under the coating may or may not be conductive (e.g., a dielectric material). In another embodiment, the membrane is formed of or coated with a non-conductive or semiconductive material. The size of the membrane orifices is chosen to support an appropriate pressure difference outside (in the sample environment) and inside of the ion generation chamber using capillary forces. In an embodiment, the membrane is a metal wire mesh.

The diameter of the orifices are about 1 nm to 10 mm, about 10 nm to 100 µm, and about 100 nm to 10 µm. The membrane can include about 1 to $10^{14}$ orifices per square centimeter, about 10 to $10^{10}$ orifices per square centimeter, and about 100 to $10^6$ orifices per square centimeter. The thickness of the membrane can be about 1 nm to 10 mm, about 10 nm to 100 µm, and about 100 nm to 100 µm. The diameter of the membrane can be about 1 nm to 10 mm, about 10 nm to 100 µm, and about 100 nm to 10 µm.

The ion collection system 12 can be used to collect, guide, and/or analyze the ions from the ion generation chamber 16. The ion collection system 12 can include, but is not limited to, a mass spectrometry system, an ion trapping system, electrochemical (e.g., impedance or redox based) and/or electromechanical (e.g., piezoelectric) sensors, other systems that can be used to analyze ions, and combinations thereof.

The mass spectrometry system and the ion trapping system can include, but are not limited to, a time-of-flight (TOF) mass spectrometry system, an ion trap mass spectrometry system (IT-MS), a quadrapole (Q) mass spectrometry system, a magnetic sector mass spectrometry system, and an ion cyclotron resonance (ICR) mass spectrometry system, and combinations thereof. The mass spectrometry system and the ion trapping system can include an ion detector for recording the number of ions that are subjected to an arrival time or position in a mass spectrometry system, as is known by one skilled in the art. Ion detectors can include, for example, a microchannel plate multiplier detector, an electron multiplier detector, or a combination thereof. In addition, the mass spectrometry system includes vacuum system components and electric system components, as are known by one skilled in the art.

Figure 2:
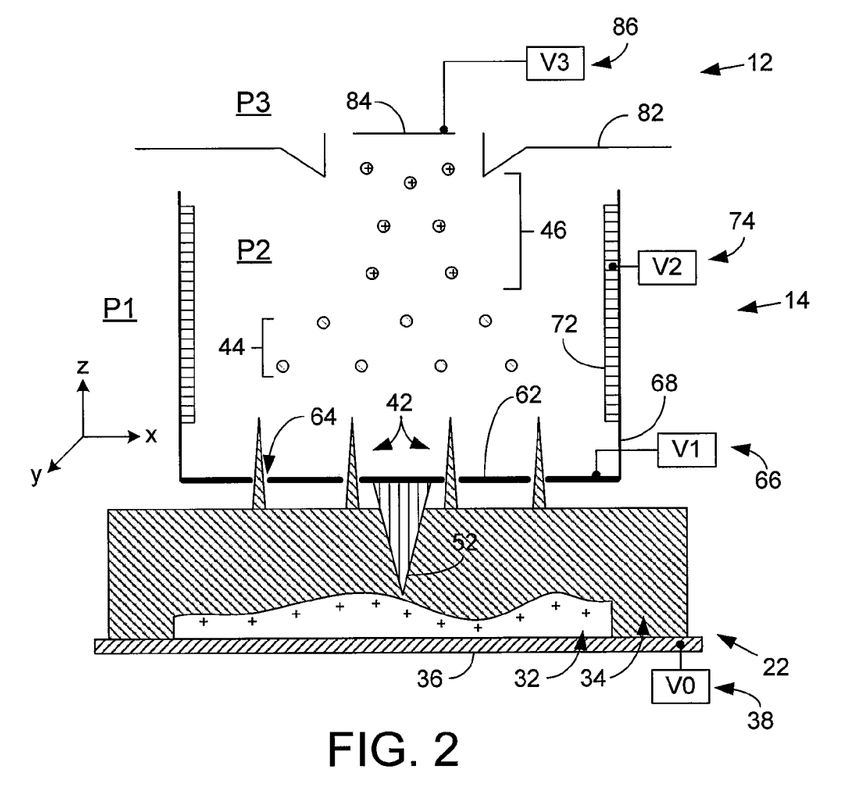
FIG. 2 illustrates an embodiment of a scanning ion probe system according to the present disclosure.

FIG. 2 illustrates an embodiment of a scanning ion probe system. The scanning ion probe system includes, but is not limited to, the ion collection system 12, the scanning ion source system 14, and the sample 22. The sample 22 includes, but is not limited to, a sample composition 32 disposed on or adjacent to a sample electrode 36 (or an array of electrodes in an alternative embodiment) in an electrolyte solution 34. The sample electrode 36 is in electrical communication with a voltage source 38 (V0), which can apply a positive or negative DC potential to the sample electrode 36. In addition, the voltage source 38 can apply an AC potential to the sample electrode 36. The voltage can range from about 0 V to 100 kV, but depends on the sample composition, electrolyte, and the like. The application of the voltage to the sample composition is performed to generate ions from one or more chemical or biological species in the sample composition.

The scanning ion source system 14 includes, but is not limited to, a scanning ion probe 52, a membrane 62 having orifices 64, and ion chamber walls 68. The scanning ion probe 52 is positioned on the membrane 62. The membrane 62 is interfaced with the chamber walls 68. Appropriate electrical, electric, and/or mechanical structures can be used to configure the scanning ion probe 52, the membrane 62, and the chamber walls 68 to form the scanning ion source system 14. The scanning ion probe 52, the membrane 62, and the chamber walls 68 are appropriately electrically isolated.

The scanning ion probe 52 can be used to scan in the x- and/or y-axis. In addition, the scanning ion probe 52 can be used to "tap" the sample by moving in the z-axis direction. For example, "tapping" may be beneficial when the sample is a biological sample (e.g., a cell).

A membrane voltage source 66 (V1) is in electrical communication with the membrane electrode 62 and can apply a positive or negative DC potential to the membrane 62. In addition, the voltage source 66 can apply an AC potential to the membrane electrode 62. The voltage (V1) can range from about 0 V to 100 kV, but depends on the sample composition, electrolyte phase (e.g., liquid vs. gel/solid) and composition, the electric potential applied to the other electrodes, and the like. The application of the voltage to the membrane 62 is performed to form the reverse-Taylor cone of the electrolyte through the membrane orifices 64, which draws in the ions generated from the sample composition in the form of solvated ions 44.

An ion chamber electrode or an array of individually-controlled ion-guiding electrodes 72 is disposed on portions of the chamber walls 68. The ion chamber electrode 72 is in electrical communication with the ion chamber voltage source 74 (V2) and can apply a positive or negative DC potential to the ion chamber electrode array 72. Each electrode in the array can have a different potential. In an embodiment, the ion chamber voltage source 74 can apply a DC and an AC voltage. The voltage can range from about 0 V to 100 kV, but depends on the sample composition, electrolyte, the electric potential applied to the other electrodes, and the like. The application of the voltage to the ion chamber electrode 72 is performed to guide the ions (solvated ions 44 and de-solvated "dry" ions 46) from the membrane 62 at the first end of the scanning ion source system 14 to the second end of the scanning ion source system 14 adjacent the ion collection system 12. As mentioned above, the potential(s) applied to the ion chamber electrode(s) 72 depends in part on the potential applied to the membrane 62 and any electrodes present in the ion collection system 12 (e.g., ion collection electrode 84).

It should be noted that a heating source or element may be used to increase the temperature in the ion generation chamber 16 to assist in the de-solvation of the solvated "wet" ions 44 to de-solvated or "dry" ions 46. In short, the reverse-Taylor cone of the electrolyte present in the ion generation chamber 16 forms solvated ions 44 in drops of electrolyte 34. The "wet" ions 44 progress to "dry" ions 46 through de-solvation processes that are known in electrospray technologies. The temperature, pressure, and applied potentials can be used to form "dry" ions 46.

The ion collection system 12 is disposed at the second end of the ion generation chamber 16 opposite the membrane 62. In another embodiment, the membrane 62 and the ion collection system 12 may not be "in-line" as shown in FIG. 2. The ion collection system 12 can include, but is not limited to, an interfacing structure 82 and an ion collection electrode 84. The interfacing structure 82 can be part of a structure used to connect the scanning ion source system 14 with the ion collection system 12.

The ion collection electrode 84 (e.g., an array of electrodes) is in electrical communication with an ion collection voltage source 86 (V3), which can apply a positive or negative DC potential to the ion collection electrode 84. Each electrode in the array can have a different potential. In an embodiment, the ion collection electrode 84 can apply a DC and/or an AC voltage. The voltage can range from about 0V to 100 kV, but depends on the sample composition, electrolyte, the electric potential applied to the other electrodes, the type of the ion collection system 12, and the like. The application of the voltage to the ion collection electrode 84 is performed to guide the "dry" ions 46 into the ion collection system 12. As mentioned above, the potential applied to the ion collection electrode 84 depends, at least in part, on the potential applied to the membrane 62, the ion generation electrode (array of electrodes) 72, and any electrodes present in the ion collection system 12 or the scanning ion source system 14.

As mentioned above, the ion collection system 12 can be used to collect, guide, and/or analyze the ions from the ion generation chamber 16. The ion collection system 12 can include, but is not limited to, a mass spectrometry system, an ion trapping system, electrochemical sensors, electromechanical sensors, other systems that can be used to analyze ions, and combinations thereof.

The pressure outside the ion generation system 14 (P1), the pressure in the ion generation system 14 (P2), and the pressure in the ion collection system 12 (P3) can vary depending, in part, on the ion collection system 12, the dimensions of the ion generation system 14, the size and shape of the membrane orifices, the electrolyte, the degree of solvation of the ions entering the ion generation system 14, the mode of the system operation, and the like. P1, P2, and P3 can be about $10^{-10}$ torr (high vacuum) to 100 times the atmospheric pressure (100*760 torr). In an embodiment, the relative pressures may be the following: $P1 \geq P2 \geq P3$, and it can be controlled by using an external vacuum and/or compression pumps, proper vacuum isolation fixtures, and in some embodiments, when the ion generation chamber is submerged into the electrolyte solution, the size of the membrane orifices may be used to control the pressure difference between P1 and P2 using the capillary forces at the liquid/membrane interface. Other combinations in relative magnitude of pressures P1, P2, and P3 can also be envisioned.

Figure 3:
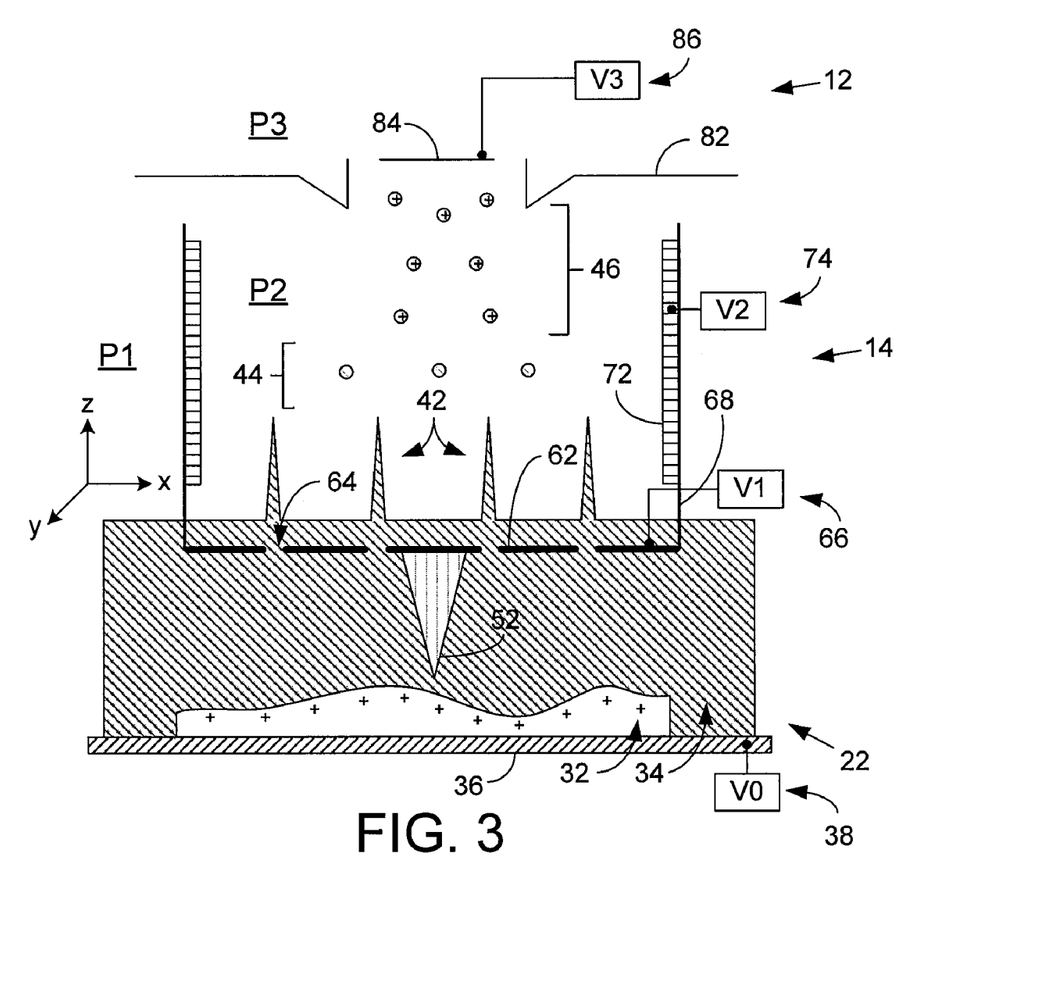
FIGS. 3 and 4 illustrate two additional embodiments of the scanning ion probe system of the present disclosure.
Figure 4:
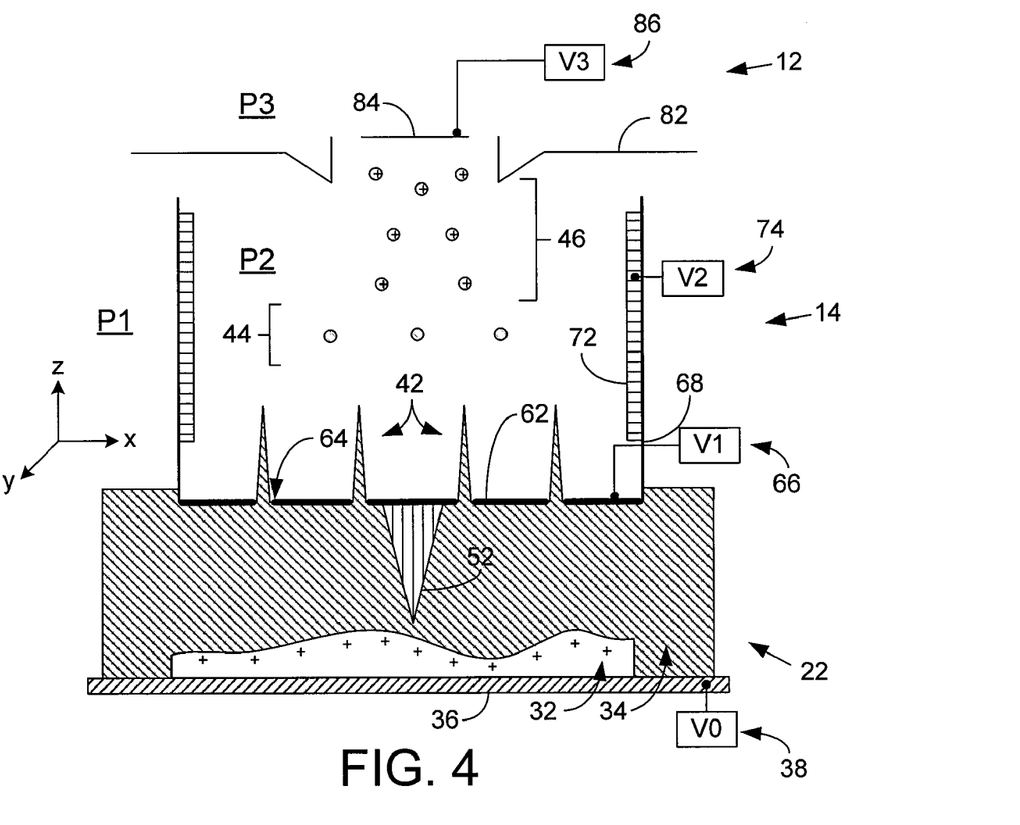

FIGS. 3 and 4 illustrate two additional embodiments of the scanning ion probe system. In FIG. 3, the electrolyte 34 level is raised so that electrolyte enters the ion generation chamber 14 through the orifices 64 of the membrane 62. It should be noted that the reverse-Taylor cone is still generated under these conditions.

In FIG. 4, the electrolyte solution 34 level is raised so that electrolyte is in contact with the membrane 62, but the electrolyte 34 does not enter the ion generation chamber 14 through the orifices 64 of the membrane 62. It should be noted that the reverse-Taylor cones are still generated under these conditions, and they are formed on free surface of the electrolyte upon application of sufficiently strong electric field thereby pulling the ions from the solution to the ion generation chamber.

Figure 5:
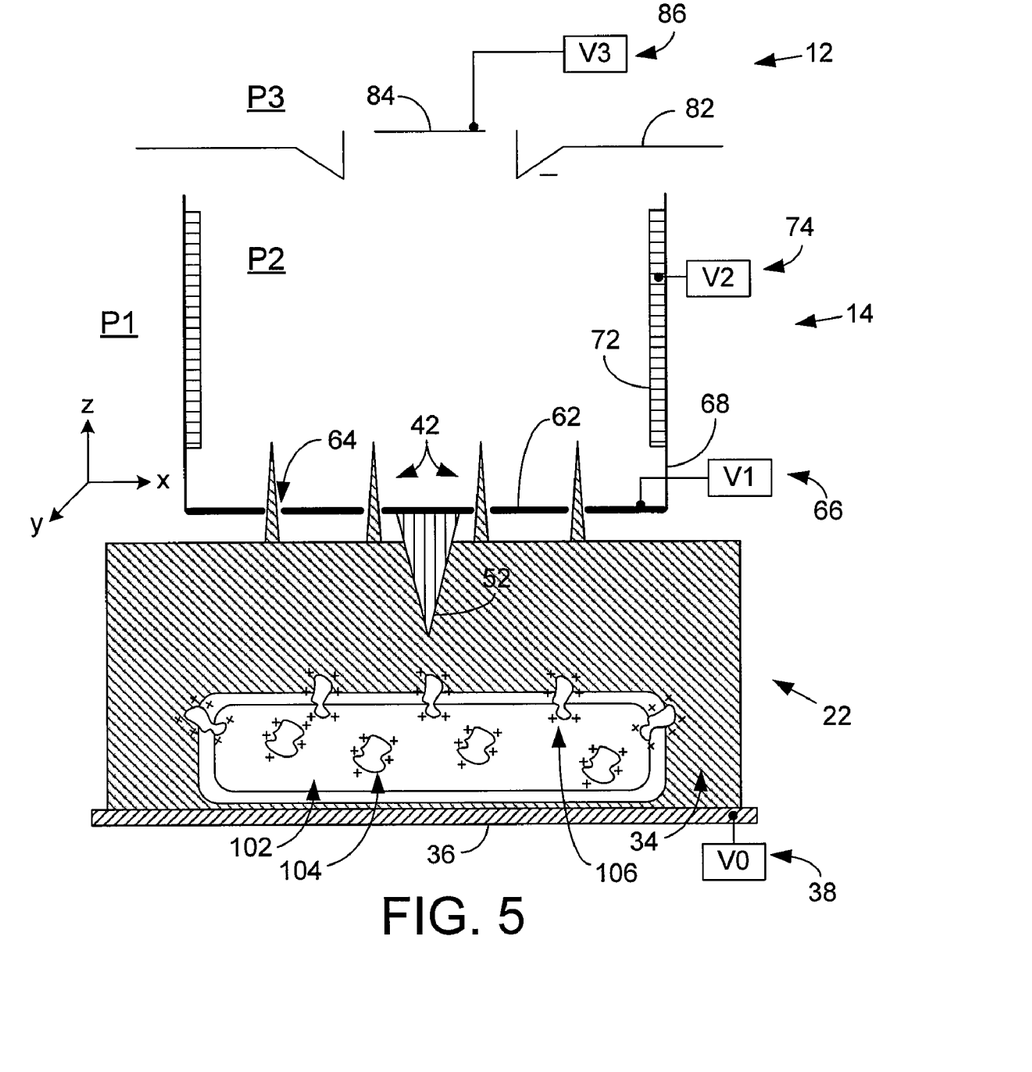
FIG. 5 illustrates another embodiment of the scanning ion probe system of the present disclosure in which the sample is a biological cell.

FIG. 5 illustrates another embodiment of the scanning ion probe system in which the sample is a cell 102. The scanning ion probe system can be used to obtain and/or analyze, for example, polypeptide and/or polynucleotide ions. For example, under appropriate conditions, the polypeptide ions 106 on the surface (membrane) of the cell 102 can be studied. In addition, under appropriate conditions, the polynucleotide ions 104 in the cell 102 can be studied. In an embodiment, the scanning ion probe system can be used to study a single biological cell or other biological structure (e.g., a virus) at a time in a sample.

Judicious application of the electric potentials V0 and V1 could be used to selectively pull charged biomolecules (e.g., proteins, DNA, and/or KNA) either from the cell membrane or from the inside of the cell. By changing the magnitude of the electric field, cell poration (opening pores in the cell membrane) or lysis (destruction of the cell membrane) can be induced to release the cell content for ionic analysis by the probe with (lysis) or without (poration) cell death.

While embodiments of the present disclosure are described in connection with Example 1 and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

The following experiments demonstrate that embodiments of the present disclosure are capable of reversibly generating charged ions in a sample, transporting the ions through a membrane, transporting the ions in the ion generating chamber, measuring a signal, and scanning mode imaging of different solutions/samples having varying ion concentration (ionic strength) and chemical composition.

The following experiments demonstrate that embodiments of the present disclosure are capable of reversibly generating charged ions in a sample, transporting the ions through the membrane, transporting the ions in the ion generating chamber, measuring a signal, and testing of different solutions/samples having varying ion concentration (ionic strength) and chemical composition.

An embodiment of the present disclosure included a cylindrical quartz sampling tube with the metal mesh acting as a membrane 62 and the electrode 66 (with a plurality of 25 micrometer diameter orifices 64) and the counter (ground) electrode 84 positioned inside of the sampling tube at a controlled distance (via XYZ micrometer stage). The counter electrode 84 was also connected to a currentmeter with a pre-amplifier, which was used to measure the electric current produced during experiments. In this embodiment, the counter electrode 84 also functioned as an ion collection system 12 Detection of the measurable current on the counter electrode and its dependence on the sampling solution ion composition and probe configuration (e.g., distance between the working and the ground electrodes) is direct evidence of the device capabilities as an ion probe system.

The experiments were repeated several times starting from "all equipment OFF" position. The following is the summary of results. The solutions of deionized water, various salts, and MeOH—$H_2O$-Acetic Acid (varying concentration from 0.1 to 1.0%) were used as the ionic buffers in the experiments.

Effect of the applied potential on the working electrode on ion generation: When the zero potential (relative to the ground) was applied to the electrode no measurable current (within the detection system noise) was produced regardless of the ionic strength of electrolyte (e.g., from pure dielectric DI water to highly concentrated salt solution). An increase in the voltage (gradually from 0 V to 500 V to 1000 V to 1250 V) applied to the working electrode resulted in a significant (three or more orders of magnitude increase) in the detected current (which is a measure of ion generation and transport from the working electrode to the reference electrode) for the electrolyte solutions. The effect was more significant with an increase in the solution ionic strength (e.g., when acid concentration was increased), when the mesh electrode was not fully submerged, but in direct contact with the solution, and when the distance between the working mesh electrode and the reference electrode was the smallest (varied from about 3 cm down to about 1 mm). This provides experimental proof of successful ion generation using reverse-Taylor-cones formed above each hole in the mesh of the working electrode 66 upon application of sufficiently strong electric potential relative to the ground (collection) electrode 84.

Effect of the solution composition/ionic strength on ion generation: The device was capable of sensitive detection of a change in the electric current flowing through the ground electrode (device detector) when testing of the electrolyte solutions/samples with different ionic strength of electrolyte (accomplished by varying acid concentration in the MeOH—$H_2O$-Acetic Acid electrolyte). The experiments were performed at a constant distance mode to eliminate the effect of the between-the-electrode distance on the detected electric current. The experiments clearly showed an increase in detected ions (current) while electrospraying the higher ionic strength sample, and the operation was reversible (e.g., no hysteresis was observed) when testing was first performed of the high ionic strength samples and then the low ionic strength samples and vice-versa. The same results were observed when samples of different ionic composition (e.g., different salts) were analyzed (imaged) by the device. This demonstrates the capability for electrospraying samples of different ionic make-up by embodiments of the present disclosure.

Effect of the distance between the working electrode and scanned sample surface (integration of ion generation system with AFM scanning ion probe): The device was capable of sensitive detection of a change in the electric current flowing through the ground electrode (device detector) as scanning was performed of the electrolyte solutions/samples at different height above the sample surface. This was controlled by the large scale "prototype" of the AFM tip. These results demonstrate that ion generation/sampling can be combined with simultaneous topographical imaging of the sample, for example, using an AFM scanning ion probe or any other "distance-measuring" method.

Although the methodologies of this disclosure have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined solely by the appended claims.

What is claimed is:

1. A method, comprising:
   providing a scanning ion source system, comprising:
   a scanning ion probe; and
   an ion generation chamber including a membrane disposed at a first end of the ion generation chamber and chamber walls interfaced with the membrane, wherein the membrane includes a plurality of orifices through the membrane, and wherein the scanning ion probe is disposed adjacent the membrane;
   disposing the scanning ion probe into a sample, wherein the sample includes an electrolyte, and wherein the sample is disposed adjacent a sample electrode;

determining a first location in the sample using the scanning ion probe;
applying a first voltage to the sample electrode and a second voltage to the membrane;
ionizing molecules in the sample to produce a plurality of first ionized molecules, wherein the difference between the first voltage and the second voltage generates a first potential force that drives the first ionized molecules towards the membrane, wherein the first ionized molecules are from the first location;
producing a reverse-Taylor-cone of the electrolyte through one or more of the orifices in the membrane, wherein the electrolyte includes the first ionized molecules; and
applying a third voltage to an ion generation chamber electrode disposed on a portion of the chamber walls, wherein the difference between the third voltage and the second voltage generates a second potential force that drives the first ionized molecules towards a second end of the ion generation chamber.

2. The method of claim 1, further comprising:
providing an ion collection chamber system at the second end of the ion generation chamber;
applying a fourth voltage to a ion collection chamber electrode, wherein the difference between the fourth voltage and the third voltage generates a third potential force that drives the first ionized molecules towards the ion collection chamber.

3. The method of claim 2, further comprising:
analyzing a mass-to-charge ratio of the first ionized molecules.

4. The method of claim 3, further comprising:
moving the scanning ion source system to a second location in the sample;
determining the second location in the sample using the scanning ion probe;
applying the first voltage to the sample electrode and the second voltage to the membrane;
ionizing molecules in the sample to produce a plurality of second ionized molecules, wherein the difference between the first voltage and the second voltage generates the first potential force that drives the second ionized molecules towards the membrane, wherein the second ionized molecules are from the second location;
producing a reverse-Taylor-cone from the electrolyte through the orifices in the membrane, wherein the electrolyte includes the second ionized molecules; and
applying the third voltage to the ion generation chamber electrode disposed on a portion of the chamber walls, wherein the difference between the third voltage and the second voltage generates the second potential force that drives the second ionized molecules towards the second end of the ion generation chamber.

5. The method of claim 4, wherein moving is performed in a direction selected from: an x-axis, a y-axis, a z-axis, and a combination thereof.

6. The method of claim 1, wherein the membrane is disposed in the electrolyte.

7. The method of claim 1, wherein the electrolyte is disposed in a portion of the ion generation chamber.

8. The method of claim 1, wherein the membrane is disposed above the electrolyte.

9. The method of claim 1, further comprising:
heating the ion generation chamber to assist in de-solvation of charged droplets produced from the reverse-Taylor-cone of the electrolyte.

10. A method, comprising:
disposing a scanning ion probe into a sample, wherein the sample includes an electrolyte, and wherein the scanning ion probe is disposed on a first side of a membrane having a plurality of orifices;
determining a first location in the sample using the scanning ion probe;
ionizing molecules in the first location of the sample to produce a plurality of first ionized molecules, wherein the first ionized molecules are disposed on the first side of the membrane;
producing a reverse-Taylor-cone of the electrolyte through one or more of the plurality of orifices in the membrane on a second side of the membrane on the side opposite the scanning ion probe, wherein the electrolyte includes the first ionized molecules;
generating de-solvated first ionized molecules from the reverse-Taylor-cone of the electrolyte on the second side of the membrane; and
generating a potential force on the second side of the membrane that drives the de-solvated first ionized molecules away from the membrane.

11. The method of claim 10, further comprising:
analyzing a mass-to-charge ratio of the de-solvated first ionized molecules.

12. The method of claim 11, further comprising:
relating an identity of the de-solvated first ionized molecules to the first location of the scanning ion probe in the sample.

13. The method of claim 10, further comprising:
moving the scanning ion probe to a second location in the sample;
determining the second location in the sample using the scanning ion probe;
ionizing molecules in the second location of the sample to produce a plurality of second ionized molecules, wherein the second ionized molecules are disposed on the first side of the membrane;
producing a reverse-Taylor-cone of the electrolyte through one or more of the plurality of orifices in the membrane on the second side of the membrane on the side opposite the scanning ion probe, wherein the electrolyte includes the second ionized molecules;
generating de-solvated second ionized molecules from the reverse-Taylor-cone of the electrolyte on the second side of the membrane; and
generating a potential force on the second side of the membrane that drives the de-solvated second ionized molecules away from the membrane.

14. The method of claim 13, further comprising:
analyzing a mass-to-charge ratio of the de-solvated second ionized molecules.

15. The method of claim 14, further comprising:
relating an identity of the de-solvated second ionized molecules to the second location of the scanning ion probe in the sample.

* * * * *